United States Patent
Siegrist

(10) Patent No.: US 10,593,960 B2
(45) Date of Patent: Mar. 17, 2020

(54) MICRO GALVANIC CELL STRIPS

(71) Applicant: James Siegrist, Cathedral City, CA (US)

(72) Inventor: James Siegrist, Cathedral City, CA (US)

(*) Notice: Subject to any disclaimer, the term of this patent is extended or adjusted under 35 U.S.C. 154(b) by 199 days.

(21) Appl. No.: 15/099,266

(22) Filed: Apr. 14, 2016

(65) Prior Publication Data

US 2016/0308221 A1 Oct. 20, 2016

Related U.S. Application Data

(60) Provisional application No. 62/178,544, filed on Apr. 14, 2015.

(51) Int. Cl.
| | |
|---|---|
| *H01M 6/32* | (2006.01) |
| *H01M 4/38* | (2006.01) |
| *H01M 4/62* | (2006.01) |
| *H01M 4/06* | (2006.01) |
| *H01M 4/02* | (2006.01) |

(52) U.S. Cl.
CPC ............... *H01M 6/32* (2013.01); *H01M 4/06* (2013.01); *H01M 4/38* (2013.01); *H01M 4/624* (2013.01); *H01M 2004/025* (2013.01); *H01M 2220/30* (2013.01)

(58) Field of Classification Search
CPC .......... H01M 6/32; H01M 4/624; H01M 4/38; H01M 4/06; H01M 2004/025; H01M 2220/30
See application file for complete search history.

(56) References Cited

U.S. PATENT DOCUMENTS

| | | | | |
|---|---|---|---|---|
| 5,895,112 A | * | 4/1999 | Olivit | F21L 2/00 362/116 |
| 6,033,602 A | * | 3/2000 | Sunshine | H01M 4/06 252/511 |
| 8,709,631 B1 | * | 4/2014 | Jiang | H01M 4/92 429/2 |
| 2005/0282066 A1 | * | 12/2005 | Hasegawa | H01M 6/32 429/118 |
| 2011/0216476 A1 | * | 9/2011 | Fleischer | H01G 11/36 361/502 |
| 2014/0030569 A1 | * | 1/2014 | Kwon | H01M 4/04 429/94 |

FOREIGN PATENT DOCUMENTS

WO    WO 2007116872 A1 * 10/2007 ............. C22C 23/02

OTHER PUBLICATIONS

English Translation of Wei, WO2007116872A1.*

* cited by examiner

*Primary Examiner* — Evan P Dzierzynski
(74) *Attorney, Agent, or Firm* — Nick Guinn; Gunn, Lee & Cave, P.C.

(57) ABSTRACT

An apparatus in the form of a cell for powering an electrical device, such as a light source, that includes a first electrode generally in the shape of a rectangular metallic strip; a second electrode generally in the shape of a length of metallic wire wrapped around the first electrode; and a conductive absorbent material wrapped at least partially around the first electrode.

22 Claims, 2 Drawing Sheets

MICRO GALVANIC CELL STRIPS

CROSS REFERENCES TO RELATED APPLICATIONS

This original non-provisional application claims priority to, and the benefit of, U.S. provisional application 62/178,544, filed Apr. 14, 2015, which is incorporated by reference.

FEDERALLY SPONSORED RESEARCH

Not applicable.

BACKGROUND OF THE INVENTION

1. Field of the Invention

The present invention relates generally to energy generation. More specifically, the present invention relates to an energy cell that may be activated by the addition of water.

2. Description of the Related Art

Voltaic cells, also referred to as galvanic cells, using chemical energy are known and can be used to produce electricity, which may in turn be used to provide power to any number of different devices. Referring to FIG. 1 of U.S. application Ser. No. 14/155,411, filed Jan. 15, 2014 (the '411 Application), and which is incorporated by reference, such cells comprise two electrodes referred more specifically to as an anode 105 and a cathode 110, as well as a salt bridge 115, a wire 120 and two reaction vessels 125, 130. Anode 105 is formed from vessel 125 filled with zinc sulfate and having immersed in it an electrode 105 made of zinc. Cathode 110 is formed from vessel 130 filled with copper sulfate and having immersed in it an electrode 110 made of copper. While the specific design parameters may vary, the basic principles resulting from their composition is the same. In particular, an oxidation-reduction (i.e., electron transfer) reaction occurs between zinc electrode 105 and copper electrode 110, and the transferred electrons are forced through an electrical circuit 120. An oxidation-reduction reaction is referred to herein as a "redox" reaction. In a typical redox reaction, the reactants are mixed together in a single reaction vessel. When the reactants collide, one or more electrons are transferred and products are formed. For example, a Zn atom reacts with a Cu2+ ion to produce a Zn2+ ion and a Cu atom.

In this case, the electrons are transferred directly between the reactants, and the chemical energy is converted to heat. In a voltaic cell, the reactants are separated into two solutions and connected by a wire. The reactants do not collide forcing the electrons to be transferred indirectly through the wire, and the chemical energy is converted into electrical work.

A problem with the known voltaic cells described is that the components quickly corrode and fail. Further, the portable salt bridge, the number of cells, and the liquid containment requirements for the required solution are all difficult to engineer for commercial use.

The '411 Application describes an apparatus and method for long life water cells that overcomes these problems. The cells described in the '411 Application have a cylindrical anode and a cylindrical cathode. These two cylindrical electrodes are of different metallic composition and are separated by an absorbent material that holds moisture and facilitates the conductivity of electrons between the two electrodes. The electrodes and the absorbent material are immersed in a container or reservoir filled with water within which oxidation-reduction reactions occur between the two electrodes producing chemical energy that may be used as a power supply. A protective sealant coating applied to one or both electrodes protects the electrodes and reduces or stops the oxidation process and decay to prolong the life of the cell. The invention of the '411 Application, however, is bulky, and not easily usable either alone or in series with other cells.

BRIEF SUMMARY

The present invention comprises a first electrode generally in the shape of a rectangular metallic strip; a second electrode generally in the shape of a length of metallic wire wrapped around the first electrode; and a conductive absorbent material wrapped at least partially around the first electrode.

DETAILED DESCRIPTION OF CERTAIN EMBODIMENTS

Figure 1:
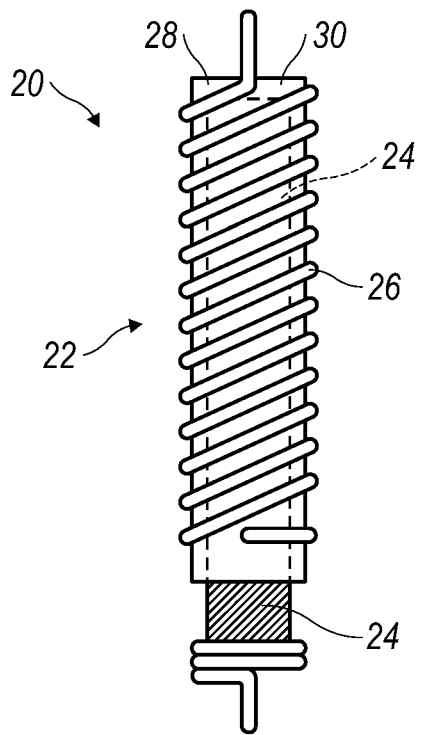
FIG. 1 is a top view of an embodiment of the present invention.

FIG. 1 shows an embodiment 20 of the invention, which embodiment 20 is a cell 22 with a magnesium anode 24, a copper wire cathode 26, and an absorbent conducting material 28 such as a paper barrier 30 (e.g., a piece of a commonly available paper towel) between the anode 24 and the cathode 26. The anode 24 is a rectangular strip approximately 0.875 (⅞) inch long, 0.15 inch wide and 0.0625 (1/16) inch thick. The paper barrier 30 is wrapped around part of the length of the anode 24. The cathode 26 is 24-gauge bare copper wire wrapped around the anode 24 and paper barrier 30, and is not in direct contact with the anode 24. In this embodiment, the paper barrier 30 is embedded with sodium percarbonate and/or food grade citric acid by moistening the paper, spreading the sodium percarbonate or food grade citric acid on the paper so that it is absorbed, and then allowing the paper to dry. To activate the cell 22, the paper barrier 30 is wetted with water, which allows ions to flow radially between the anode 24 and the cathode 26 through the barrier, provided that a circuit using the cell is otherwise closed.

While this embodiment uses sodium percarbonate and/or food grade citric acid, more generally salts, acids and oxidizers may be used provided they are available in dry form. Also, while this embodiment uses a paper towel, more generally any absorbent paper or cloth material may be used. And although this embodiment is described as using magnesium and copper electrodes, any two dissimilar metals (i.e., metals with different electrode potentials) may be used.

Figure 2:
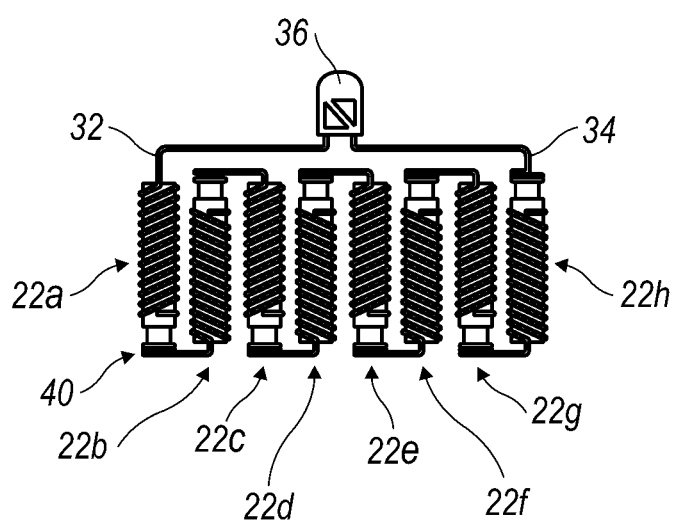
FIG. 2 shows an alternative embodiment in which multiple cells are electrically connected in series, and the cells are further connected to a light source.

In FIG. 2, eight cells 22a-h are connected in a cell series 40, with the cells 22a-h having a positive terminal 32 that is coterminal with the anode of one cell 22a and the negative terminal 34 that is coterminal with the cathode of another cell 22h. A light source, such as a LED 36, is electrically connected between the positive terminal 32 and the negative terminal 34. To activate the embodiment, the paper barriers of each cell 22a-h are wetted as described with reference to FIG. 1, which allows ions to flow radially between the anode and cathode of each cell 22a-h through the barriers.

Figure 3:
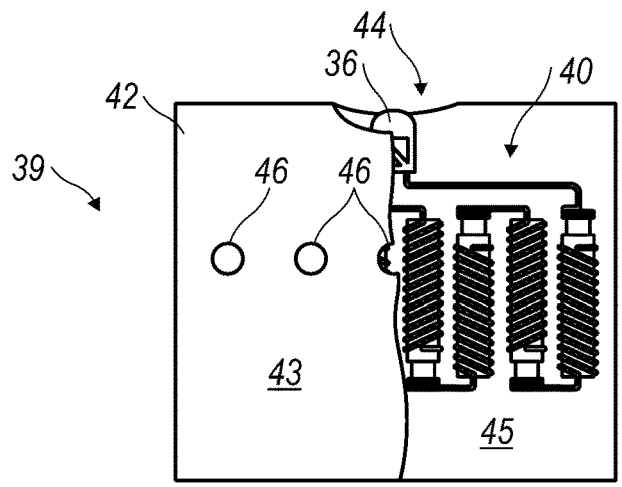
FIG. 3 shows is a top partial section view of yet another alternative embodiment in which multiple cells and the light source described with respect to FIG. 2 are contained within a shroud.
Figure 4:
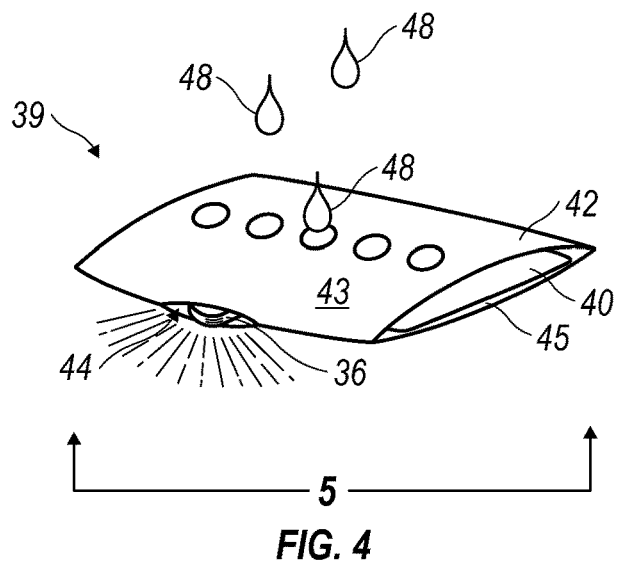
FIG. 4 is a side perspective view of the embodiment shown in FIG. 3.

FIG. 3-4 show a specific embodiment 39 of the cell series 40 described with reference to FIG. 2 in which the cells 22a-h are within an opaque plastic shroud 42. The shroud 42 has a length, a width, and a depth, with the depth being substantially less than either the length of the width. The shroud 42 includes a top layer 43 and a bottom layer 45. The shroud 42 defines an opening 44 proximal to the LED 26 partially through the top layer 43 and partially through the bottom layer 45. A number of circular openings 46 extend through the top layer 43 shroud 42.

Referring to FIG. 4, to activate the embodiment 39, the paper barriers of each cell (not shown) are wetted through the openings 46 with water 48, which allows ions to flow radially between each cell's anode and cathode as previously described. Alternatively, the entire embodiment 39 may be immersed in water to activate the light. Typically, activating the embodiment will energize the LED 26 for hours, until the paper barriers of each cell begin to dry. This inhibits ion flow between the respective anode. The embodiment may then be reactivated by the same process. The embodiment 39 may also be frozen or fan dried to inhibit ion flow.

Figure 5:
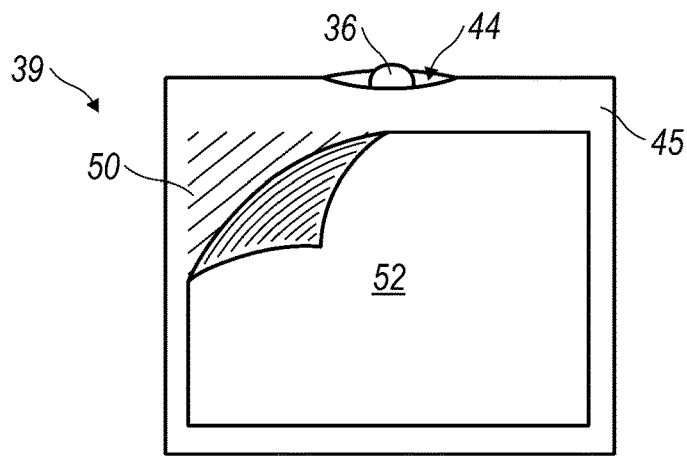
FIG. 5 shows a bottom view of the embodiment described with reference to FIGS. 3-4.

Referring to FIG. 5, an adhesive 50 covers a portion of the bottom layer 45 and covered by a film 52. The film 52 is adhered to the bottom layer 45 with the adhesive 50. When desired, the film 52 may be peeled away from the bottom layer 45 to expose the adhesive 50. Thereafter, the adhesive 50 may bond the shroud 42 to a surface (e.g., an article of clothing).

The present invention is described in terms of specifically-described embodiments. Those skilled in the art will recognize that other embodiments of such device can be used in carrying out the present invention. Other aspects and advantages of the present invention may be obtained from a study of this disclosure and the drawings, along with the appended claims.

I claim:

1. An apparatus comprising:
    a first electrode generally in the shape of a rectangular metallic strip and being a first metal;
    a second electrode generally in the shape of a length of metallic wire wrapped around the first electrode and being a second metal that is dissimilar from the first metal;
    a conductive absorbent material wrapped at least partially around the first electrode;
    a light source electrically connected to the first electrode and the second electrode; and
    a shroud surrounding the first electrode, the second electrode and the conductive absorbent material, wherein there is not a complete barrier between the shroud and at least one of the electrodes.

2. The apparatus of claim 1 wherein said shroud comprises an aperture proximal to the light source.

3. The apparatus of claim 2 wherein said aperture surrounds the light source.

4. The apparatus of claim 1 wherein said shroud defines a first opening proximal to the light source, and at least one second opening proximal and penetrable to the conductive absorbent material.

5. The apparatus of claim 1 wherein the conductive absorbent material is paper embedded with sodium percarbonate.

6. The apparatus of claim 1 wherein the conductive absorbent material is paper embedded with food grade citric acid.

7. The apparatus of claim 1 wherein the first metal is magnesium and the second metal is copper.

8. A low profile lighting apparatus comprising:
    a plurality of electrically connected cells, each cell having a first electrode generally in the shape of a rectangular metallic strip, a second electrode formed generally in the shape of a length of metallic wire wrapped around the first electrode, a conductive absorbent material wrapped at partially around the first electrode;
    a light source electrically connected to the plurality of electrically connected cells; and
    a shroud surrounding the first electrode, the second electrode and the conductive absorbent material, wherein there is not a complete barrier between the shroud and at least one of the electrodes.

9. The apparatus of claim 8 wherein said shroud defines a first opening proximal to the light source, and at least one second opening proximal and penetrable to the conductive absorbent material.

10. The apparatus of claim 9 wherein said first opening surrounds the light source.

11. The apparatus of claim 8 wherein the conductive absorbent material is paper embedded with sodium percarbonate.

12. The apparatus of claim 8 wherein the conductive absorbent material is paper embedded with food grade citric acid.

13. The apparatus of claim 8 wherein the first metal is magnesium and the second metal is copper.

14. An apparatus comprising:
    a first electrode generally in the shape of a rectangular metallic strip and being a first metal;
    a conductive absorbent material wrapped at least partially around the first electrode;
    a second electrode generally in the shape of a length of metallic wire wrapped around the conductive absorbent material and being a second metal that is dissimilar from the first metal;
    a shroud surrounding the first electrode, the second electrode and the conductive absorbent material;
    the shroud having a top layer, a bottom layer, and a plurality of openings extending through the top layer.

15. The apparatus of claim 14 further comprising a light source electrically connected to the first electrode and the second electrode.

16. The apparatus of claim 15 wherein said shroud comprises an aperture proximal to the light source.

17. The apparatus of claim 16 wherein said aperture surrounds the light source.

18. The apparatus of claim 16 wherein the aperture exists partially through the top layer and partially through the bottom layer.

19. The apparatus of claim 14 wherein the conductive absorbent material is paper embedded with sodium percarbonate.

20. The apparatus of claim 14 wherein the conductive absorbent material is paper embedded with food grade citric acid.

21. The apparatus of claim 14 wherein the first metal is magnesium and the second metal is copper.

22. An apparatus comprising:
- a series of one or more cells each having a magnesium anode, a copper wire cathode, and an absorbent conducting material such as a paper barrier between the anode and the cathode;
- a light source connected to the series of one or more cells;
- an opaque plastic shroud having a length, a width, and a depth, with the depth being less than either the length of the width, the shroud also having a top layer and a bottom layer, the shroud also having an opening proximal to the LED partially through the top layer and partially through the bottom layer; and
- a plurality of circular openings extending through the top layer and permeable to the absorbent conducting material.

* * * * *